US012492626B2

(12) United States Patent
Ramanujam et al.

(10) Patent No.: US 12,492,626 B2
(45) Date of Patent: Dec. 9, 2025

(54) COMPRESSION HEAT INTEGRATED HIGH EFFICIENCY OFFSHORE PROCESS PLATFORM UNIT

(71) Applicant: J. Ray McDermott, Houston, TX (US)

(72) Inventors: Venkata Krishnan Ramanujam, Sugar Land, TX (US); Srinivas Rajabahadur Arcot, Fulshear, TX (US)

(73) Assignee: J. Ray McDermott, S.A., Houston, TX (US)

( * ) Notice: Subject to any disclaimer, the term of this patent is extended or adjusted under 35 U.S.C. 154(b) by 381 days.

(21) Appl. No.: 17/663,850

(22) Filed: May 18, 2022

(65) Prior Publication Data

US 2022/0381128 A1 Dec. 1, 2022

Related U.S. Application Data

(60) Provisional application No. 63/194,022, filed on May 27, 2021.

(51) Int. Cl.
| | |
|---|---|
| *E21B 43/34* | (2006.01) |
| *B01D 19/00* | (2006.01) |
| *E21B 43/01* | (2006.01) |
| *B01D 53/26* | (2006.01) |

(52) U.S. Cl.
CPC .......... *E21B 43/34* (2013.01); *B01D 19/0036* (2013.01); *E21B 43/0107* (2013.01); *B01D 53/263* (2013.01)

(58) Field of Classification Search
CPC ...... E21B 43/34; E21B 43/0107; E21B 43/36; B01D 19/00; B01D 19/36; B01D 53/263; B01D 17/02; B01D 19/0068; B01D 2313/221; B01D 2317/02; B01D 53/226; B01D 63/046; B01D 53/1425; B01D 2252/2023; C10L 2290/06; C10L 2290/46; C10L 2290/54; C10L 3/101; C10L 3/106; C10L 2290/12
USPC ............................................................ 96/218
See application file for complete search history.

(56) References Cited

U.S. PATENT DOCUMENTS

| | | | |
|---|---|---|---|
| 4,948,393 A * | 8/1990 | Hodson | B01D 17/0208 95/254 |
| 2013/0312614 A1* | 11/2013 | Zainal Abidin | B01D 45/08 96/242 |
| 2015/0253076 A1* | 9/2015 | Briglia | F25J 3/0223 62/617 |

(Continued)

OTHER PUBLICATIONS

International Search Report / Written Opinion issued to PCT/US2022/029838 on Aug. 31, 2022.

*Primary Examiner* — Jennifer Dieterle
*Assistant Examiner* — Qianping He
(74) *Attorney, Agent, or Firm* — Patterson + Sheridan, LLP

(57) ABSTRACT

A system for processing oil and gas at an offshore facility includes a single stage separation module. A gas stream from the single stage separation module is pressurized in a primary compressor, and then is used to heat the incoming oil and gas upstream of the single stage separation module. Flash gas from treatment of an oil stream from the single stage separation module is pressurized in a flash gas compressor and then is used to heat glycol utilized in a gas dehydration unit. The pressurized flash gas is then commingled with the gas stream from the single stage separation module upstream of the primary compressor.

20 Claims, 3 Drawing Sheets

(56) References Cited

U.S. PATENT DOCUMENTS

| | | |
|---|---|---|
| 2016/0047217 A1 | 2/2016 | Hoy et al. |
| 2017/0232379 A1* | 8/2017 | Carmody ............. B01D 53/263 |
| | | 95/191 |
| 2018/0002623 A1* | 1/2018 | Noekleby .......... B01D 19/0036 |
| 2020/0122082 A1* | 4/2020 | Geerts .................. B01D 53/265 |

* cited by examiner

COMPRESSION HEAT INTEGRATED HIGH EFFICIENCY OFFSHORE PROCESS PLATFORM UNIT

CROSS-REFERENCE TO RELATED APPLICATION

The present Application for Patent claims priority to U.S. Provisional Application No. 63/194,022, filed May 27, 2021, which is hereby expressly incorporated by reference herein in its entirety.

BACKGROUND

Field

Embodiments of the present disclosure generally relate to systems, apparatus, and methods for the processing of fluids produced from wells, such as oil, gas, and/or condensate wells, and more specifically concerns the processing of such fluids at an offshore location, such as platform or a floating vessel.

Description of the Related Art

Offshore-based fluid processing plant typically includes gas-liquid separators, oil dehydration/desalting equipment, compressor skids, a glycol dehydration and regeneration system, networks of heating and cooling media, utilities, and an effluent treatment system. Such offshore installations include multiple power generation systems, each having an individual waste heat recovery unit weighing as much as 30 to 60 tons. An offshore installation can include multiple waste heat recovery units supporting the heating requirements of the installation.

Conventional offshore fluid processing involves the separation of produced fluids into gas, oil, and water streams before the streams undergo further treatment. The separation entails a staged de-pressurizing of the produced fluids from the pressure at the wellheads to atmospheric pressure or sub-atmospheric pressure. The depressurizing is achieved in a series of separators, each successive separator being operated at a lower pressure than a previous separator. For example, typical operating pressures for first, second, and third stage separators are at about 435 psig (about 30 barg), about 145 psig (about 10 barg), and about 50.8 psig (about 3.5 barg), respectively. Intermediate heating between separation stages, and between fluid separation and other treatments, is performed using utility driven heaters and heat exchangers. Oil from the separators is then subjected to dehydration and desalting, which typically are performed at pressures up to about 45 psig (about 3.1 barg). The dehydrated and desalted oil is then routed to a dry oil tank, which typically is operated at or slightly above atmospheric pressure.

Because of the multitude of operating pressures of the various treatment stages, flash gas from each separator stage, the dehydration and desalting stage, the dry oil tank exists at many different pressures. Thus, recovery of the flash gas requires multiple sets of compressors. Compression of gas results in heating of the gas, and the heat generated by the compression of the flash gas in each compressor is removed by a dedicated cooling medium, such as sea water or a mixture of glycol and water.

Dehydration of the pressurized gas usually is achieved using a glycol system in which a glycol absorbs water from the gas in a contactor and then releases the absorbed water in a regenerator. The contactor is typically operated at a relatively high pressure but a relatively low temperature, whereas the regenerator is typically operated at a relatively low pressure (such as near atmospheric pressure) but a relatively high temperature. At least a portion of the heat for the regenerator is supplied by electric coils and a contactor condenser, which has very narrow temperature difference between the hot and cold sides. Cooling is provided by a heat exchanger with a cooling medium, such as water.

Conventional offshore fluid processing, therefore, occupies significant space, and hence adds substantial weight to the offshore platform or floating vessel. Additionally, such offshore fluid processing plants typically are characterized by high energy usage and large demands for heating and cooling utilities. The size of each offshore installation is limited by the available space for processing equipment and the total weight of processing equipment that can be accommodated. Such limitations restrict the fluid handling capacity of conventional processing systems, but the exceeding of these limitations is detrimental to capital costs of offshore installations as well as to operating costs in terms of energy usage, utility consumption, maintenance, etc.

Thus, there is a need for improved fluid processing systems that facilitate efficiencies in process plant space utilization, weight, energy usage, and utility consumption.

SUMMARY

The present disclosure generally relates to systems and methods for processing hydrocarbons produced at an offshore facility. In one embodiment, a fluid processing facility includes an inlet line configured to convey a fluid. The fluid processing facility further includes a single stage separation module configured to separate the fluid into a gas stream, an oil stream, and a water stream. A heat network is coupled between the inlet line and the single stage separation module. The heat network is configured to heat the fluid using gas from the gas stream.

In another embodiment, a fluid processing facility includes an inlet line configured to convey a fluid. The fluid processing facility further includes a single stage separation module configured to separate the fluid into a gas stream, an oil stream, and a water stream. A heat network is coupled between the inlet line and the single stage separation module. The heat network is configured to heat the fluid using oil from the oil stream.

In another embodiment, a method of processing a fluid includes heating the fluid in a heat network to produce a heated fluid, and separating the heated fluid into a gas stream, an oil stream, and a water stream using a single stage separation module. The method further includes pressurizing the gas stream using a first compressor to produce a pressurized gas stream, and conveying the pressurized gas stream to the heat network, thereby heating the fluid.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure concerns systems, apparatus, and methods for the processing of fluids produced from wells, such as oil, gas, and/or condensate wells, and more specifically concerns the processing of such fluids at an offshore location, such as platform or a floating vessel. Aspects of the present disclosure provide for the integration of heating and cooling systems of a well fluid processing plant, thereby driving efficiencies in process plant weight, capital cost, utility usage, utility cost, and operating cost.

Figure 1:
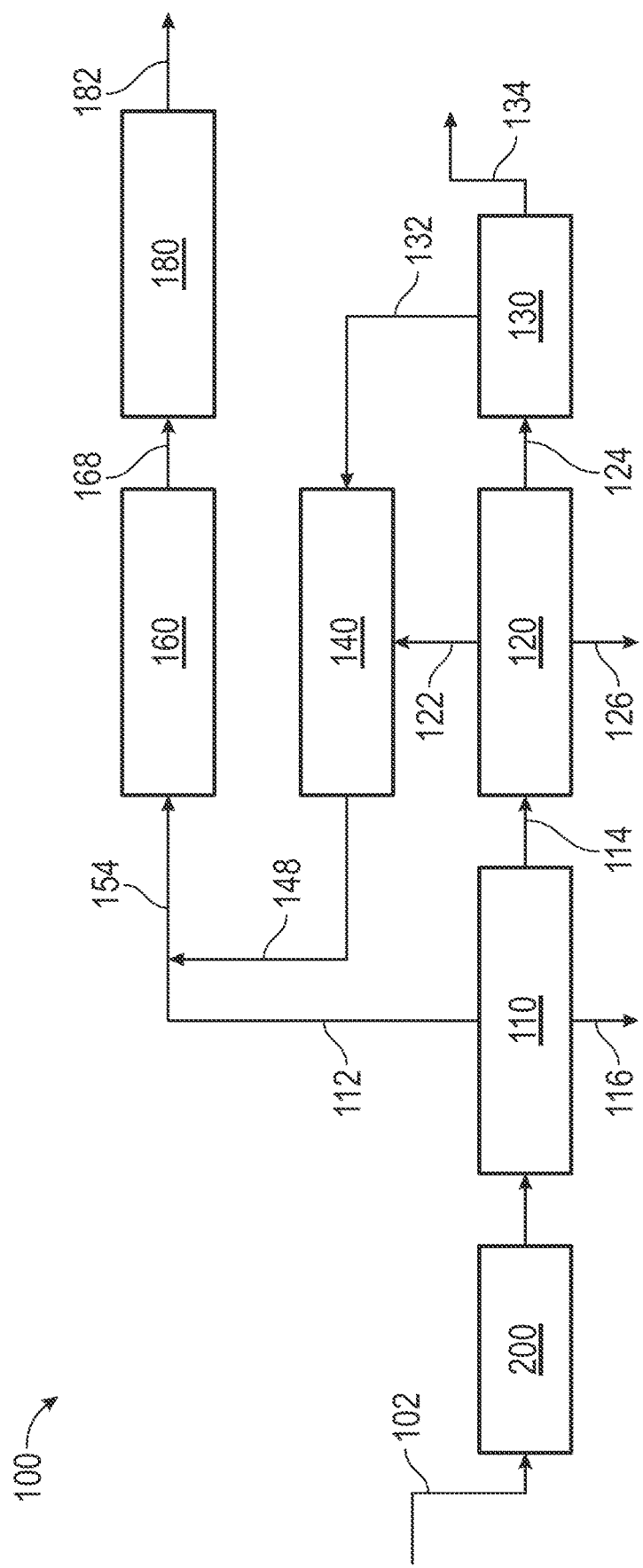
FIG. 1 schematically shows a fluid processing system.

FIG. 1 is a schematic overview of an example fluid processing system 100. Produced fluid 102 from one or more wells is routed through a heat network 200 and into a separation module 110. However, in some embodiments, it is contemplated that the produced fluid 102 may bypass the heat network 200, and may be routed directly into the separation module 110. The produced fluid 102 may include gas, oil, condensate, water, or any combination thereof. The produced fluid 102 may include particulates, such as sand; rock fragments; scale; precipitated solids, such as salts; metallic fragments; non-metallic fragments; rust; or any other solid material that may be produced from a well. The produced fluid 102 may include dissolved solids, such as salts. In an exemplary example, the produced fluid 102 may be at a pressure of about 150 to about 450 psig (about 10.3 to about 31.0 barg) and a temperature of about 60 to about 120 deg. F. (about 15.6 to about 48.9 deg. C.). In some embodiments, other pressures and/or temperatures are contemplated, depending on aspects such as the conditions within specific wells, the fluids being produced, and the particular production regimes employed.

Figure 2:
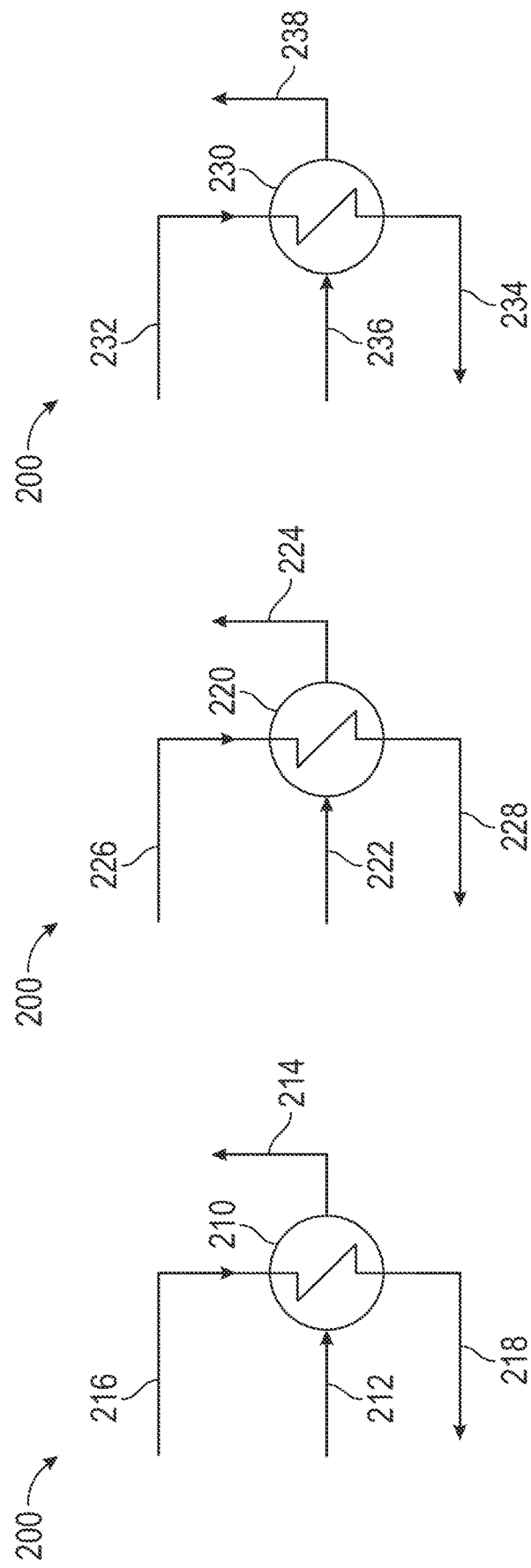
FIGS. 2A-2C schematically show portions of a heat network.

In some embodiments, the heat network 200 raises the temperature of the produced fluid 102 to about 300 to about 350 deg. F. (about 148.9 to about 176.7 deg. C.) using one or more heat exchanger. FIG. 2A schematically shows a heat exchange module 210 of the heat network 200. The produced fluid 102 enters the heat exchange module 210 via input stream 212, and exits the heat exchange module 210 via output stream 214. The heating is provided by relatively hot dry oil which enters the heat exchange module 210 via input stream 216, and exits the heat exchange module 210 via output stream 218. The relatively hot dry oil is sourced from a stream in the fluid processing system 100, as described below. In some embodiments, it is contemplated that the heat exchange module 210 includes a single heat exchanger that receives all the produced fluid 102. In some embodiments, it is contemplated that the heat exchange module 210 includes a plurality of individual heat exchangers, each individual heat exchanger configured to receive a portion of the produced fluid 102, and heat the produced fluid 102 using a portion of the relatively hot dry oil.

FIG. 2B schematically shows a heat exchange module 220 of the heat network 200. The produced fluid 102 enters the heat exchange module 220 via input stream 222, and exits the heat exchange module 220 via output stream 224. The heating is provided by relatively hot gas which enters the heat exchange module 220 via input stream 226, and exits the heat exchange module 220 via output stream 228. The relatively hot gas is sourced from a stream in the fluid processing system 100, as described below. In some embodiments, it is contemplated that the heat exchange module 220 includes a single heat exchanger that receives all the produced fluid 102. In some embodiments, it is contemplated that the heat exchange module 220 includes a plurality of individual heat exchangers, each individual heat exchanger configured to receive a portion of the produced fluid 102, and heat the produced fluid using a portion of the relatively hot gas.

In some embodiments which may be combined with other embodiments, it is contemplated that the produced fluid 102 is routed through one or more heat exchanger of the heat exchange module 210, but is not routed through a heat exchanger of the heat exchange module 220. In some embodiments which may be combined with other embodiments, it is contemplated that the produced fluid 102 is routed through one or more heat exchanger of the heat exchange module 220, but is not routed through a heat exchanger of the heat exchange module 210. In some embodiments which may be combined with other embodiments, it is contemplated that the produced fluid 102 is routed through one or more heat exchanger of the heat exchange module 210 and one or more heat exchanger of the heat exchange module 220. In some embodiments which may be combined with other embodiments, it is contemplated that the produced fluid 102 is routed through one or more heat exchanger of the heat exchange module 210 and then through one or more heat exchanger of the heat exchange module 220. In some embodiments which may be combined with other embodiments, it is contemplated that the produced fluid 102 is routed through one or more heat exchanger of the heat exchange module 220 and then through one or more heat exchanger of the heat exchange module 210.

Returning to FIG. 1, in the separation module 110, the produced fluid 102 undergoes separation into a gas stream 112, an oil stream 114, and a water stream 116. It is understood by those of ordinary skill that the gas stream 112 may contain some entrained oil and water. Likewise, the oil stream 114 may contain some entrained gas and water, and the water stream 116 may contain some entrained oil and gas. Similar to conventional offshore processes, fluid processing using the fluid processing system 100 involves the separation of the produced fluid 102 into gas, oil, and water streams 112, 114, 116, respectively, before the streams 112, 114, 116 undergo further treatment. However, unlike conventional offshore processes, the separation does not entail a staged de-pressurizing of the produced fluid 102. The separation module 110 facilitates a single stage separation of the produced fluid 102 into the gas, oil, and water streams 112, 114, 116, respectively. In some embodiments, it is contemplated that the separation module 110 includes a single separator. However, a plurality of individual separators operating in parallel are also contemplated, each individual separator receiving a feed of the produced fluid 102 directly from the heat network 200, or from a bypass of the heat network 200, and separating the produced fluid 102 into the respective gas, oil, and water streams 112, 114, and 116. Thus, the single stage separation of the produced fluid 102 may be achieved by a single separator, or by each one of multiple separators operating in parallel.

A separator of the separation module 110 operates at a pressure of about 150 to about 300 psig (about 10.3 to about 20.6 barg) and a temperature of about 300 to about 350 deg. F. (about 148.9 to about 176.7 deg. C.). Operating a separator at such conditions facilitates separation of gas, oil, and water in a single separation stage. For example, as much as about eighty-five percent of the gas in the produced fluid 102 may be separated into the gas stream 112.

The oil stream 114 from the separation module 110 is fed into an oil treatment module 120. It is contemplated that the oil treatment module 120 performs dehydration of the incoming oil stream 114. Additionally or alternatively, it is contemplated that the oil treatment module 120 performs desalting of the incoming oil stream 114. Additionally or alternatively, it is contemplated that the oil treatment module 120 performs dehydration and desalting of the incoming oil stream 114. Water and any salt removed from the incoming oil stream 114 is produced in a water effluent stream 126.

Residual gas is liberated from the oil stream 114 in the oil treatment module 120, and is produced in a gas outlet stream 122. For example, as much as about ten percent of the gas in the produced fluid 102 entering the fluid processing system 100 may be liberated in the oil treatment module 120. The liberated gas is routed to a flash gas compressor 140, as described below.

The oil treatment module 120 includes a single treatment vessel. However, it is also contemplated that the oil treatment module 120 may include a plurality of individual treatment vessels operating in series, with the oil exiting a first treatment vessel then entering a second treatment vessel. Alternatively, it is contemplated that the oil treatment module 120 may include a plurality of individual treatment vessels operating in parallel, each individual treatment vessel receiving a feed of the incoming oil stream 114 directly from the separation module 110. It is contemplated that a treatment vessel of the oil treatment module 120 may operate at a pressure of about 170 to about 350 psig (about 11.7 to about 24.1 barg) and a temperature of about 300 to about 350 deg. F. (about 148.9 to about 176.7 deg. C.).

The oil stream 114 from the separation module 110 is conveyed to the oil treatment module 120 with the aid of a booster pump, however, the aid of a booster pump may be omitted. In some embodiments, it is contemplated that the oil stream 114 from the separation module 110 is mixed with fresh water prior to, or upon, entering the oil treatment module 120. In some embodiments, it is contemplated that the oil stream 114 from the separation module 110 is not mixed with fresh water prior to, or upon, entering the oil treatment module 120.

The oil treatment module produces a dry oil stream 124 that is routed to a dry oil tank 130. An offtake from the dry oil stream 124 provides the relatively hot dry oil that is used in the heat exchange module 210 to heat the produced fluid 102. The relatively hot dry oil of the offtake from the dry oil stream 124 is cooled by the produced fluid 102, and then returned to the dry oil stream 124 and routed to the dry oil tank 130. It is contemplated that a portion of the dry oil stream 124 may be diverted through the offtake to the heat exchange module 210. For example, about twenty to about eighty percent, such as about thirty to about seventy percent, such as about forty to about sixty percent of the dry oil stream 124 may be diverted through the offtake to the heat exchange module 210. In other embodiments, it is contemplated that substantially all of the dry oil stream 124 may be diverted through the offtake to the heat exchange module 210. For example, about eighty to about one hundred percent, such as about ninety percent of the dry oil stream 124 may be diverted through the offtake to the heat exchange module 210. In still further embodiments, it is contemplated that a relatively minor amount of the dry oil stream 124 may be diverted through the offtake to the heat exchange module 210. For example, about zero to about twenty percent, such as about ten percent of the dry oil stream 124 may be diverted through the offtake to the heat exchange module 210.

The dry oil tank 130 is operated at a pressure of about 0 to about 10 psig (about 0 to about 0.7 barg) and at ambient temperature. Dry oil 134 from the dry oil tank 130 is routed to export, such as via export pumps (not shown). Residual gas 132 that flashes off the dry oil 134 in the dry oil tank 130 is routed to the flash gas compressor 140. The flash gas compressor 140 may operate with a single compression stage or with a plurality of compression stages. It is contemplated that the residual gas 132 that flashes off the dry oil 134 is compressed in a first compression stage, then combined with the gas outlet stream 122 from the oil treatment module 120, and then compressed in a second compression stage. In some embodiments which may be combined with other embodiments, it is contemplated that the residual gas 132 that flashes off the dry oil 134 is cooled before being compressed in the first compression stage. The flash gas compressor 140 may produce a gas discharge 148 at a pressure of about 150 to about 300 psig (about 10.3 to about 20.6 barg) and a temperature of about 300 to about 350 deg. F. (about 148.9 to about 176.7 deg. C.). In some embodiments which may be combined with other embodiments, it is contemplated that the flash gas compressor 140 may produce a gas discharge 148 at a pressure such that the gas discharge 148 may be readily commingled with the gas stream 112 from the separator module 110, such as a pressure similar to the pressure of the gas stream 112 from the separator module 110.

In contrast to conventional fluid processing systems, the gas stream 112 from the separation module 110 is not routed to the flash gas compressor 140. Therefore, the flash gas compressor 140 may be sized to compress less gas than an equivalent flash gas compressor of a conventional fluid processing system. For example, the flash gas compressor 140 may be sized to compress from about thirty to about seventy percent, such as about forty to about sixty percent, such as about fifty percent of the quantity of gas that otherwise would be compressed by a flash gas compressor of a conventional fluid processing system. Consequentially, the flash gas compressor 140 is lighter in weight, smaller, and more cost effective to purchase and operate than a flash gas compressor of a conventional fluid processing system. Additionally, the smaller size of the flash gas compressor 140 compared to a flash gas compressor of a conventional fluid processing system can enable savings in footprint, weight, and cost of associated transformers and drivers.

The gas discharge 148 from the flash gas compressor 140 is combined with the gas stream 112 produced from the separation module 110 to produce a commingled gas stream 154. The commingled gas stream 154 is routed to a high pressure, or primary, compressor 160. The primary compressor 160 may operate with a single compression stage or with a plurality of compression stages. The primary compressor 160 produces a gas discharge 168 at a pressure of about 1,000 to about 1,450 psig (about 68.9 to about 100.0 barg), such as about 1,200 to about 1,350 psig (about 82.7 to about 93.1 barg), and a temperature of about 300 to about 350 deg. F. (about 148.9 to about 176.7 deg. C.). Heat exchange module 220 provides the necessary cooling to the gas discharge 168, and thus the heat generated by compression of gas in the primary compressor 160 is recovered by heating the produced fluid 102 in heat exchange module 220.

The gas discharge 168 from the primary compressor 160 is routed to a gas dehydration module 180, and the gas 182 exiting the gas dehydration module is routed to export via an export compressor (not shown).

In some embodiments which may be combined with other embodiments, it is contemplated that the dehydration module 180 can be placed upstream of the primary compressor 160. The commingled gas stream 154 can be cooled and fed to the dehydration module 180 before undergoing compression by the primary compressor 160.

The gas dehydration module 180 extracts residual water from the gas discharge 168 from the primary compressor 160. The gas dehydration module 180 may include a glycol contactor in which the gas 168 entering the dehydration module 180 is contacted by a glycol, such as tetra ethylene glycol. The gas dehydration module 180 may further include a glycol regenerator in which the glycol is heated in order to release the water absorbed by the glycol.

The glycol is heated in a heat exchange module 230 prior to entering the regenerator. FIG. 2C schematically shows an example heat exchange module 230. The glycol laden with absorbed water enters the heat exchange module 230 via input stream 232, and exits the heat exchange module 230 via output stream 234. The heating is provided by the gas discharge 148 from the flash gas compressor 140 which enters the heat exchange module 230 via input stream 236, and exits the heat exchange module 230 via output stream 238. The heat exchange module 230 includes a single heat exchanger that receives all the glycol. However, the heat exchange module 230 may include a plurality of individual heat exchangers, each individual heat exchanger configured to receive a portion of the glycol, and heat the glycol using a portion of the gas discharge 148 from the flash gas compressor 140. Heat exchange module 230 provides the necessary cooling to the gas discharge 148 from the flash gas compressor 140, and thus the heat generated by compression of gas in the flash gas compressor 140 is recovered by heating the glycol in heat exchange module 230.

The heat exchange module 230 receives at least a portion of the gas discharge 168 from the primary compressor 160 instead of the gas discharge 148 from the flash gas compressor 140. It is contemplated that the operator of the fluid processing system 100 may selectively route at least a portion of the gas discharge 168 from the primary compressor 160 or the gas discharge 148 from the flash gas compressor 140 to heat exchange module 230.

In contrast to conventional fluid processing systems, the heat exchange module 230 facilitates the elimination of a glycol regenerator overhead heat exchanger. Hence, a glycol regenerator used in a fluid processing system of the present disclosure may be more compact, such as shorter, and more energy efficient than a glycol regenerator of a conventional fluid processing system. Additionally, the operation of the heat exchange module 230 with a glycol-based gas dehydration module facilitates the operation of the glycol regenerator at a pressure such that gases that typically are produced from rich glycol flash drums can be combined readily with gases evolving from the dry oil tank 130, and thus can be routed directly to the flash gas compressor 140. Hence, in contrast to conventional high purity glycol regeneration systems, eductors and vapor recovery unit compressors typically associated with glycol systems can be eliminated. Therefore, in contrast to conventional fluid processing systems, the space utilization of a glycol unit is reduced and the operation of the glycol unit is optimized when used with fluid processing systems of the present disclosure.

Furthermore, in contrast to conventional fluid processing systems, a temperature gradient between the hot and cold streams in the heat exchange module 230 reduces the need for cooling by a dedicated cooling medium at the flash gas compressor 140 and reduces the heating required at the glycol regenerator. Thus, energy usage is optimized.

Figure 3:
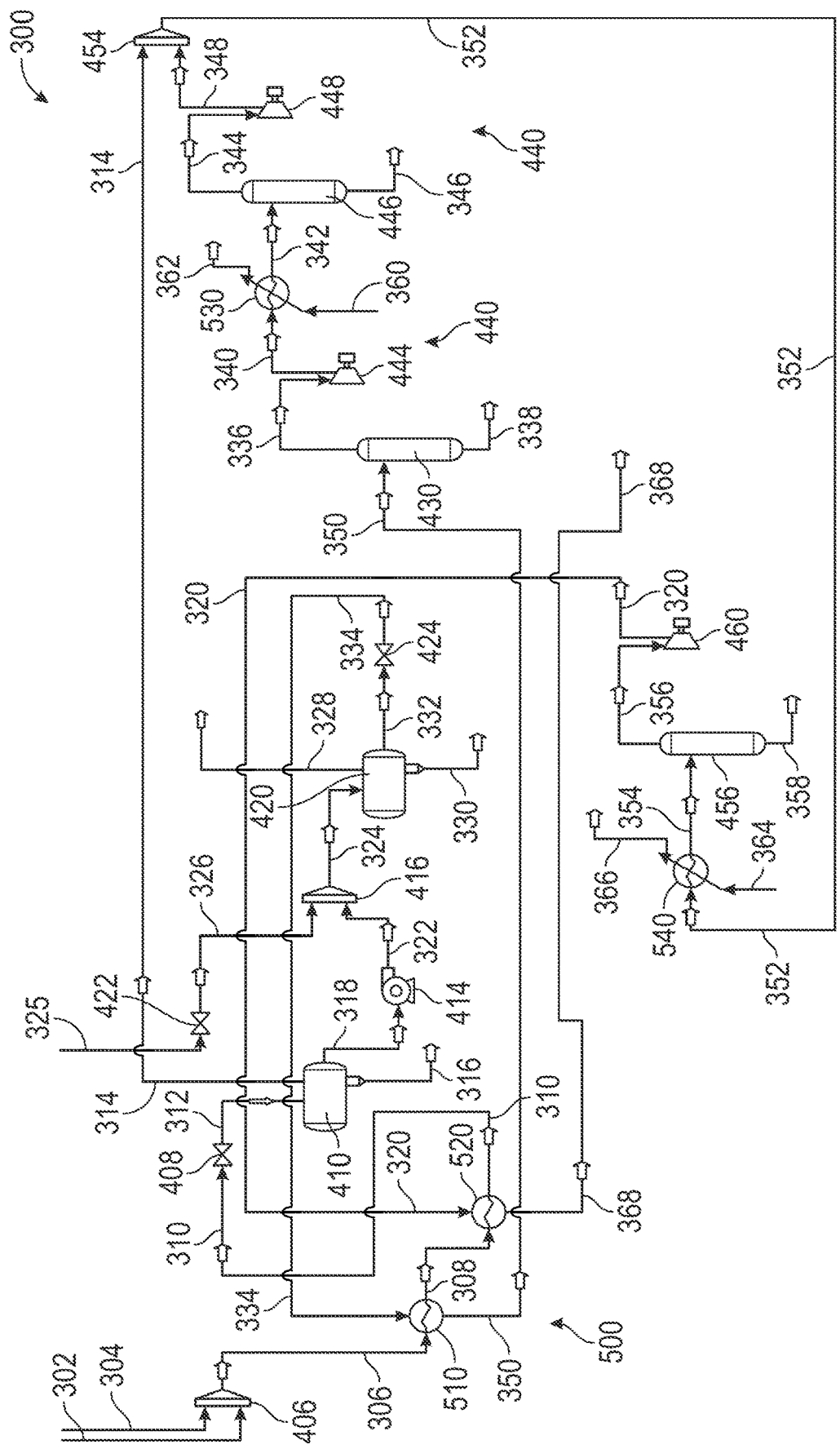
FIG. 3 schematically shows an embodiment of the fluid processing system of FIG. 1.

FIG. 3 schematically shows an embodiment of the fluid processing system of FIG. 1, represented as fluid processing system 300. The diagram in FIG. 3 is adapted from a style typically used for modeling. Produced fluids are conveyed along flowlines, schematically represented as flowlines 302 and 304, to the fluid processing system 300, and are combined at mixer 406, such as a manifold. Any suitable number of flowlines may be utilized according to the number of producing wells and other sources of produced fluids, such as wells associated with a nearby offshore platform.

The combined produced fluids proceed through line 306, and are heated at heat network 500. Heat network 500 is represented as including two heat exchangers for the purposes of modeling. Heat exchanger 510 of heat network 500 represents heat exchange module 210, and therefore may be configured as described above with respect to heat exchange module 210. Heat exchanger 520 of heat network 500 represents heat exchange module 220, and therefore may be configured as described above with respect to heat exchange module 220. The produced fluids exit heat exchanger 510 via line 308, and enter heat exchanger 520. The produced fluids may be heated to a first temperature of about 120 to about 150 deg. F. (about 48.9 to about 65.6 deg. C.) in heat exchanger 510, and then may be heated to a second temperature of about 300 to about 350 deg. F. (about 148.9 to about 176.7 deg. C.) in heat exchanger 520. After the produced fluids are heated in heat exchangers 510 and 520, the produced fluids proceed through line 310, through a valve 408, and through line 312 into separation module 410. The separation module 410 represents separation module 110 of FIG. 1, and thus provides a single stage separation of the produced fluids into gas, oil, and water streams, as described above.

Gas exits the separation module 410 via line 314, and proceeds to a mixer 454, as described further below. Water exits the separation module 410 via line 316, and proceeds to a cleaning unit (not shown) and disposal. Oil exits the separation module 410 via line 318. The oil is pumped by pump 414 via line 322 to mixer 416, where the oil is mixed with fresh water provided via line 325, valve 422, and line 326. The combined oil and fresh water flow through line 324 to an oil treatment module 420. Oil treatment module 420 represents oil treatment module 120 of FIG. 1, and thus may serve to dehydrate and/or desalt the oil, as described above.

Gas exits the oil treatment module 420 via line 328, and proceeds to either a flash gas compressor 440 or an primary compressor 460, depending upon the pressure of the gas exiting the oil treatment module 420. The flash gas compressor 440 boosts the pressure of gas up to match the inlet pressure of the primary compressor 460, and thus the gas exiting the oil treatment module 420 may be commingled into the gas passing through the flash gas compressor 440 and the primary compressor 460 at an appropriate stage. Water exits the oil treatment module 420 via line 330, and proceeds to the cleaning unit (not shown) and disposal.

Dry oil exits the oil treatment module 420 via line 332, and proceeds through valve 424 and line 334 to the heat exchanger 510 of heat network 500. In some embodiments, it is contemplated that the heat exchanger 510 may include one or more shell-and-tube heat exchangers. For example, the produced fluids may be fed into the tubes, and the dry oil may be fed into the shell(s). The produced fluids are heated, and the dry oil is cooled, in the heat exchanger 510. The cooled dry oil proceeds through line 350 to a dry oil tank 430. Dry oil tank 430 represents the dry oil tank 130 of FIG. 1, as described above. The dry oil exits the dry oil tank 430 via line 338, and proceeds to export pumps (not shown) for transport through a pipeline or into a tanker.

Gas exits the dry oil tank 430 via line 336, and proceeds to the flash gas compressor 440. The flash gas compressor 440 represents the flash gas compressor 140 of FIG. 1, and is depicted as including two compression stages. It is contemplated that the flash gas compressor 440 may be a single integrated compressor having the two compression stages. In a first compression stage 444, the gas from line 336 is pressurized from the pressure of the dry oil tank 430 to an intermediate pressure, and exits the first compression stage 444 via line 340. It is contemplated that (in absolute measurements) the intermediate pressure may be about two to about five times the pressure of the gas exiting the dry oil tank 430, such as about 2.5 to about 3.5 times the pressure of the gas exiting the dry oil tank 430.

The gas passes through heat exchanger 530, which represents a first sub-module of heat exchange module 230 of FIG. 2C, and therefore may be configured as described above with respect to heat exchange module 230. Heat exchanger 530 receives a feed of rich glycol from a gas dehydration unit (not shown) through line 360. The rich glycol is heated in heat exchanger 530, and returns to the gas dehydration unit via line 362. The gas is cooled in heat exchanger 530, and proceeds to a knock-out drum 446 via line 342. Condensate that had condensed in the gas as a result of the gas being cooled is separated from the gas in knock-out drum 446. The condensate exits the knock-out drum 446 via line 346, and proceeds either back to the dry oil tank 430 or to a condensate recovery unit (not shown).

The gas exits the knock-out drum 446 via line 344, and proceeds to a second compression stage 448 of the flash gas compressor 440. In the second compression stage 448, the gas is pressurized from the pressure in line 344 to a pressure approximately equal to the pressure of the gas exiting the separation module 410, and exits the second compression stage 448 via line 348. It is contemplated that (in absolute measurements) the exit pressure of the gas from the second compression stage 448 may be about two to about five times the pressure in line 344, such as about 2.5 to about 3.5 times the pressure in line 344.

The gas in line 348 is then commingled in mixer 454 with the gas in line 314 that exited the separation module 410. The commingled gas proceeds via line 352 to heat exchanger 540, which represents a second sub-module of heat exchange module 230 of FIG. 2C, and therefore may be configured as described above with respect to heat exchange module 230. Heat exchanger 540 receives a feed of rich glycol from the gas dehydration unit (not shown) through line 364. The rich glycol is heated in heat exchanger 540, and returns to the gas dehydration unit via line 366. The gas is cooled in heat exchanger 540, and proceeds to a knock-out drum 456 via line 354. Condensate that had condensed in the gas as a result of the gas being cooled is separated from the gas in knock-out drum 456. The condensate exits the knock-out drum 456 via line 358, and proceeds either back to the dry oil tank 430 or to the condensate recovery unit (not shown).

The gas exits the knock-out drum 456 via line 356, and proceeds to the primary compressor 460. The primary compressor 460 represents the primary compressor 160 of FIG. 1, and pressurizes the gas for feeding into the gas dehydration module (not shown). The gas exits the primary compressor 460 via line 320, and proceeds to the heat exchanger 520 of heat network 500. In some embodiments which may be combined with other embodiments, the heat exchanger 520 may include one or more shell-and-tube heat exchangers. For example, the produced fluids may be fed into the tubes, and the gas may be fed into the shell(s). The produced fluids are heated, and the gas is cooled, in the heat exchanger 520. The cooled gas proceeds through line 368 to the gas dehydration module, and thereafter to export compressors (not shown) for transport through a pipeline.

In some embodiments which may be combined with other embodiments, it is contemplated that the dehydration module can be placed upstream of the primary compressor 460. The commingled gas in line 356 can be cooled and fed to the dehydration module before undergoing compression by the primary compressor 460.

In comparison with conventional fluid processing systems, fluid processing systems of the present disclosure entail a single stage fluid separation instead of the conventional two or three stage fluid separation. Additionally, the single stage fluid separation of the present disclosure is performed at higher temperature and pressure than the separation performed using conventional fluid processing systems.

Additionally, whereas conventional fluid processing systems have heaters and coolers employing heating and cooling media, respectively, different from the fluids being processed, fluid processing systems of the present disclosure utilize an integrated heat network in which fluids being processed that are relatively hot are used as heating media directly to heat fluids being processed that are relatively cold. Similarly, fluids being processed that are relatively cold are used as cooling media directly to cool fluids being processed that are relatively hot. Thus, fluid processing systems of the present disclosure integrate gas compression into the process such that the separate heating and cooling systems of conventional fluid processing systems can be minimized or eliminated. Moreover, the waste heat recovery units associated with the power generators of conventional fluid processing systems are not required for fluid processing systems of the present disclosure, and therefore can be eliminated, thereby saving space and as much as about 80 to about 120 tons, such as about 90 to about 110 tons, in weight.

Furthermore, fluid processing systems of the present disclosure can employ a single integrated compressor for flash gas recovery instead of the multiple independent compressors used in conventional fluid processing systems. Use of the single integrated compressor is facilitated at least in part by the elimination of the need for vapor recovery compressor for the dry oil tank.

Additionally, fluid processing systems of the present disclosure provide efficiencies and cost savings compared with conventional fluid processing systems in the design and operation of glycol gas dehydration units. For example, glycol regenerators can be operated with a positive pressure instead of under a vacuum, thereby eliminating the need for a dedicated vapor recovery compressor. Furthermore, integration of the glycol unit such that hot compressed gases are used for heating not only saves energy, but also facilitates a size reduction of the glycol contactor compared to that used with a conventional fluid processing system.

The use of a fluid processing system of the present disclosure in place of a conventional fluid processing system realizes numerous benefits. For example, the need is eliminated for certain heaters and coolers at various process stages; heating and cooling networks are streamlined, thereby simplifying piping and layouts; and the need is reduced or eliminated for waste heat recovery systems. Such simplification of the fluid processing system results in reductions in the size and weight of the processing plant; overall power consumption; and operation, maintenance, and spare parts compared with conventional fluid processing systems. Hence, fluid processing systems of the present disclosure provide savings in capital and operating costs over conventional fluid processing systems.

Further benefits include improved reliability and operability of the fluid processing systems of the present disclosure over conventional fluid processing systems due to the simplification of the processing system design. Additionally, where sea water is used as a cooling medium, the reduced demand for such a cooling medium resulting from using the produced fluids as coolants results in a consequential reduction in corrosion issues. Similarly, by using the heat generated by compression of gases to raise the temperature of the produced fluids, the need for specialized heating media is reduced.

The above benefits promote the realization of energy efficiencies, and thus a processing facility employing a fluid processing system of the present disclosure may have a lower carbon footprint of an equivalent processing facility employing a conventional fluid processing system.

While the foregoing is directed to embodiments of the present disclosure, other and further embodiments of the disclosure may be devised without departing from the basic scope thereof, and the scope thereof is determined by the claims that follow.

What is claimed is:

1. A fluid processing system comprising:
an inlet line configured to convey a fluid;
a single stage separation module configured to separate the fluid into a gas stream, an oil stream, and a water stream; and
a heat network coupled between the inlet line and the single stage separation module, the heat network configured to heat the fluid using gas from the gas stream;
a primary compressor configured to receive a flash gas separated from the oil stream; and
a dehydration module configured to receive the gas from the heat network and dehydrate the gas using glycol,
wherein the heat network comprises a heat exchange module configured to receive the glycol from the dehydration module and the flash gas from an outlet of the primary compressor, wherein the glycol includes absorbed water from the gas, and the heat exchange module is configured to heat the glycol that includes the absorbed water using the flash gas;
a dry oil tank configured to receive the oil stream from the heat network;
a first stage compressor configured to receive the flash gas from the dry oil tank;
a knockout drum configured to receive the flash gas from the first stage compressor and separate condensate from the flash gas, wherein the heat exchange module is positioned between the knockout drum and the first stage compressor;
a second stage compressor positioned between the knockout drum and the primary compressor;
a second heat exchange module configured to receive a commingled gas flow, wherein the commingled gas flow includes the flash gas from the second stage compressor commingled with the gas stream; and
a second knockout drum positioned between the second heat exchange module and the primary compressor, the second knockout drum configured to separate condensate from the commingled gas flow.

2. The fluid processing system of claim 1, wherein the first stage compressor is positioned between the single stage separation module and the heat exchange module to pressurize the gas prior to delivering the gas to the heat network.

3. The fluid processing system of claim 2, wherein the heat network is configured to heat the fluid using oil from the oil stream.

4. The fluid processing system of claim 3, wherein the heat network is configured to heat the fluid to a first temperature using the oil from the oil stream and then heat the fluid to a second temperature using the gas from the gas stream.

5. The fluid processing system of claim 3, further comprising a treatment module configured to remove at least one of residual water or salt from the oil stream.

6. The fluid processing system of claim 5, further comprising a conduit configured to deliver the oil from the oil stream to the heat network from a dry oil outlet of the treatment module.

7. The fluid processing system of claim 1, wherein the first stage compressor is configured to receive flash gas from the treatment module.

8. The fluid processing system of claim 7, wherein the gas stream is routed directly to the primary compressor, thereby bypassing the first stage compressor.

9. A fluid processing system comprising:
an inlet line configured to convey a fluid;
a single stage separation module configured to separate the fluid into a gas stream, an oil stream, and a water stream;
a heat network coupled between the inlet line and the single stage separation module, the heat network configured to heat the fluid using oil from the oil stream;
a dry oil tank positioned to receive the oil stream from the heat network;
a primary compressor positioned to receive the gas stream from the single stage separation module, the primary compressor configured to compress the gas stream to a first pressure;
a first stage compressor positioned between the primary compressor and the dry oil tank to receive a flash gas from the dry oil tank, the first stage compressor configured to compress the flash gas to a second pressure that is less than the first pressure;
a knockout drum configured to receive the flash gas from the first stage compressor and separate condensate from the flash gas, wherein a heat exchange module is positioned between the knockout drum and the first stage compressor;
a second stage compressor positioned between the knockout drum and the primary compressor, the second stage compressor configured to compress the flash gas to a third pressure that is between the first pressure and the second pressure, wherein the flow of the gas stream to the primary compressor bypasses the first stage compressor and the second stage compressor; and
a second heat exchange module configured to receive a commingled gas flow, wherein the commingled gas flow includes the flash gas from the second stage compressor commingled with the gas stream.

10. The fluid processing system of claim 9, further comprising a second knockout drum positioned between the second heat exchange module and the primary compressor, the second knockout drum configured to separate condensate from the commingled gas flow.

11. The fluid processing system of claim 9, wherein the first stage compressor is positioned between the single stage separation module and the heat exchange module to pressurize the gas prior to delivering the gas to the heat network.

12. The fluid processing system of claim 9, wherein the heat network is configured to heat the fluid to a first temperature using the oil from the oil stream and then heat the fluid to a second temperature using gas from the gas stream.

13. The fluid processing system of claim 9, further comprising a treatment module configured to remove at least one of residual water or salt from the oil stream.

14. The fluid processing system of claim 13, further comprising a conduit configured to deliver the oil from the oil stream to the heat network from a dry oil outlet of the treatment module.

15. A fluid processing system comprising:
an inlet line configured to convey a fluid;
a single stage separation module configured to separate the fluid into a gas stream, an oil stream, and a water stream;
a heat network coupled between the inlet line and the single stage separation module, the heat network configured to heat the fluid using oil from the oil stream;
a dry oil tank positioned to receive the oil stream from the heat network;
a primary compressor positioned to receive the gas stream from the single stage separation module, the primary compressor configured to compress the gas stream to a first pressure;
a first stage compressor positioned between the primary compressor and the dry oil tank to receive a flash gas from the dry oil tank, the first stage compressor configured to compress the flash gas to a second pressure that is less than the first pressure;
a knockout drum configured to receive the flash gas from the first stage compressor and separate condensate from the flash gas, wherein a heat exchange module is positioned between the knockout drum and the first stage compressor;
a second stage compressor positioned between the knockout drum and the primary compressor, the second stage compressor configured to compress the flash gas to a third pressure that is between the first pressure and the second pressure; and
a second heat exchange module configured to receive a commingled gas flow, wherein the commingled gas flow includes the flash gas from the second stage compressor commingled with the gas stream; and
a second knockout drum positioned between the second heat exchange module and the primary compressor, the second knockout drum configured to separate condensate from the commingled gas flow.

16. The fluid processing system of claim 15, wherein the flow of the gas stream to the primary compressor bypasses the first stage compressor.

17. The fluid processing system of claim 15, wherein the first stage compressor is positioned between the single stage separation module and the heat exchange module to pressurize the gas prior to delivering the gas to the heat network.

18. The fluid processing system of claim 15, wherein the heat network is configured to heat the fluid to a first temperature using the oil from the oil stream and then heat the fluid to a second temperature using gas from the gas stream.

19. The fluid processing system of claim 15, further comprising a treatment module configured to remove at least one of residual water or salt from the oil stream.

20. The fluid processing system of claim 19, further comprising a conduit configured to deliver the oil from the oil stream to the heat network from a dry oil outlet of the treatment module.

* * * * *